United States Patent
Bube et al.

(10) Patent No.: US 11,093,964 B1
(45) Date of Patent: Aug. 17, 2021

(54) PROMOTION PROCESSING SYSTEM FOR GENERATING A DIGITAL OFFER BASED UPON UNPURCHASED ITEM PARTS OF A MULTI-PART PROMOTION AND RELATED METHODS

(71) Applicant: Inmar Clearing, Inc., Winston-Salem, NC (US)

(72) Inventors: Melissa Bube, High Point, NC (US); Jacob Bowman, High Point, NC (US); Joel Corra, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 47 days.

(21) Appl. No.: 16/458,639

(22) Filed: Jul. 1, 2019

(51) Int. Cl.
*G06Q 30/00* (2012.01)
*G06Q 30/02* (2012.01)
*G05B 19/418* (2006.01)

(52) U.S. Cl.
CPC ..... *G06Q 30/0238* (2013.01); *G06Q 30/0215* (2013.01); *G06Q 30/0279* (2013.01)

(58) Field of Classification Search
CPC ........... G06Q 30/0238; G06Q 30/0279; G06Q 30/0215
See application file for complete search history.

(56) References Cited

U.S. PATENT DOCUMENTS

| 6,112,191 | A | 8/2000 | Burke |
| 9,595,043 | B2 | 3/2017 | Roeding et al. |
| 2004/0133474 | A1* | 7/2004 | Tami ...................... G06Q 30/02 705/16 |
| 2012/0101881 | A1 | 4/2012 | Taylor et al. |
| 2016/0267512 | A1* | 9/2016 | Misra ................. G06Q 30/0222 |

OTHER PUBLICATIONS

"A Propositional Research Framework for the Conceptual and Technological Adoption of Digital Coupons in the US". IEEE. 2010. (Year: 2010).*
"Mobile payment through integrated NFC module on Smartphones". IEEE.2012. (Year: 2012).*

* cited by examiner

*Primary Examiner* — Maria V Vanderhorst
(74) *Attorney, Agent, or Firm* — Allen, Dyer, Doppelt + Gilchrist, P.A.

(57) ABSTRACT

A promotion processing system may include a point-of-sale (POS) terminal associated with a retailer and a promotions. The promotions server may be configured to store a multi-part promotion corresponding to item parts, cooperate with the POS terminal to determine whether less than all of the item parts for the multi-part promotion has been purchased, and generate a digital offer associated with unpurchased item parts. The promotions server may also be configured to accept user selection of one of applying the digital offer toward another item and a charitable donation.

10 Claims, 4 Drawing Sheets

PROMOTION PROCESSING SYSTEM FOR GENERATING A DIGITAL OFFER BASED UPON UNPURCHASED ITEM PARTS OF A MULTI-PART PROMOTION AND RELATED METHODS

TECHNICAL FIELD

The present invention is related to the field of electronics, and more particularly, to a system for processing promotions, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon may be redeemed at a point-of-sale (POS) terminal. Any coupons to be redeemed by the shopper are generally presented during the checkout process and processed via the POS terminal. For example, the POS terminal may process information regarding the coupon to be redeemed.

For redemption, the shopper's basket may be compared to the coupon information. A determination may made as to whether the shopper has in fact purchased or has added to their shopping basket (e.g. by way of being processed at the POS terminal) the requisite product or products and quantity thereof to qualify for the coupon. If the shopper has added the requisite product or products and quantity thereof to qualify for the coupon, the discount is typically processed at the POS.

SUMMARY

A promotion processing system may include a point-of-sale (POS) terminal associated with a retailer and a promotions server configured to store a multi-part promotion corresponding to a plurality of item parts, cooperate with the POS terminal to determine whether less than all of the item parts for the multi-part promotion has been purchased, and generate a digital offer associated with unpurchased item parts. The promotions server may also be configured to accept user selection of one of applying the digital offer toward another item and a charitable donation.

The promotions server may be configured to cooperate with the POS terminal to accept the user selection. The system may further include a mobile wireless communications device associated with the user, and the promotions server may be configured to cooperate with the mobile wireless communications device to accept the user selection, for example.

The plurality of item parts may have a same given brand associated therewith, and the another item may have the given brand associated therewith. The plurality of item parts may have different respective brands associated therewith, for example.

The digital offer may have a first digital offer value for the another item and a second digital offer value for the charitable donation, for example. The system may further include a digital wallet associated with the user, and the promotions server may be configured to store the digital offer therein.

A method aspect is directed to a method of processing a promotion. The method may include using a promotions server to store a multi-part promotion corresponding to a plurality of item parts, cooperate with a POS terminal to determine whether less than all of the item parts for the multi-part promotion has been purchased, and generate a digital offer associated with unpurchased item parts. The method may also include using the promotions server to accept user selection of one of applying the digital offer toward another item and a charitable donation.

A computer readable medium aspect is directed to a non-transitory computer readable medium for processing a promotion. The non-transitory computer readable medium includes computer executable instructions that when executed by a processor of a promotions server cause the processor to perform operations. The operations may include storing a multi-part promotion corresponding to a plurality of item parts, cooperating with a POS terminal to determine whether less than all of the item parts for the multi-part promotion has been purchased, and generating a digital offer associated with unpurchased item parts. The operations may also include accepting user selection of one of applying the digital offer toward another item and a charitable donation.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
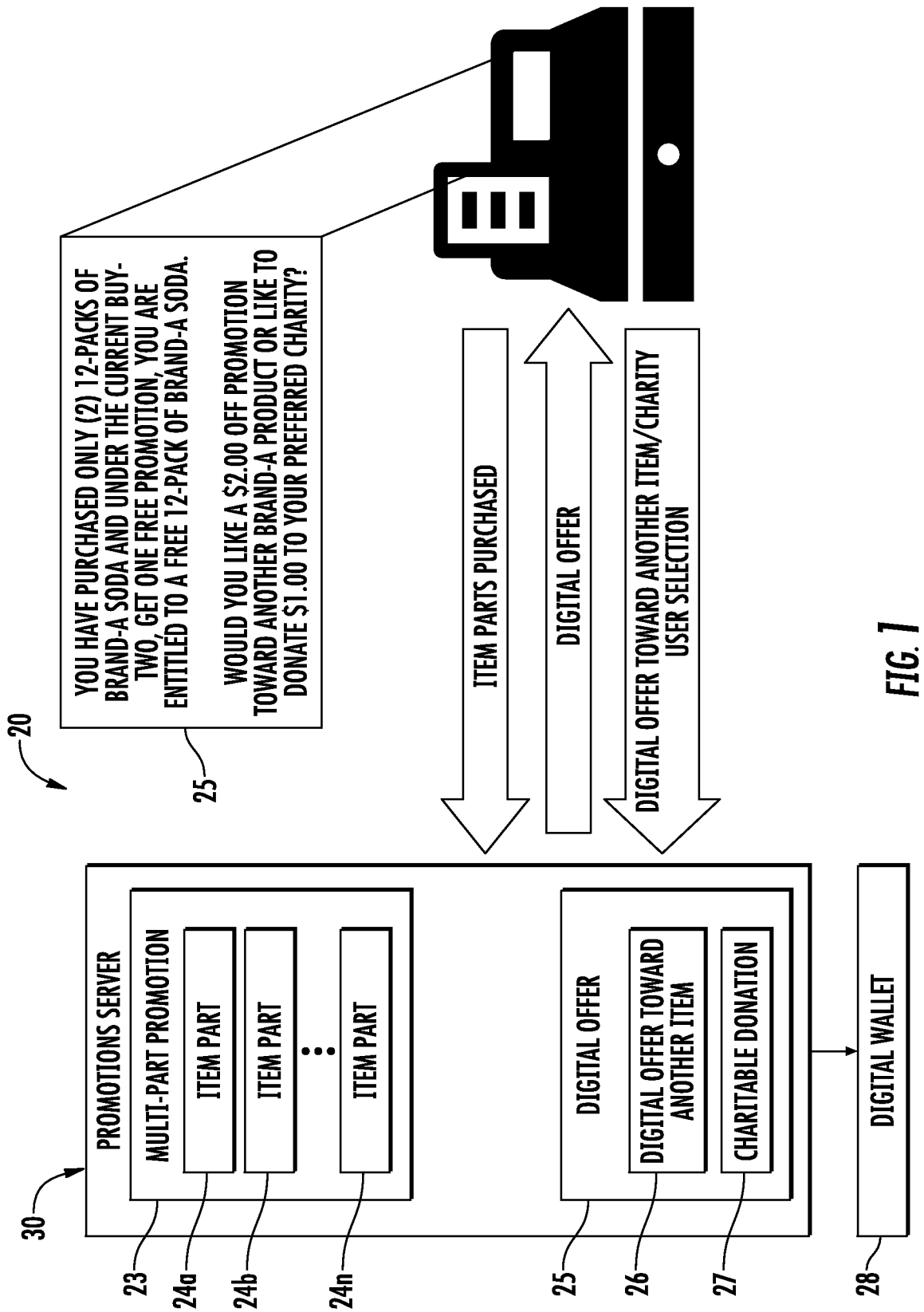
FIG. 1 is a schematic diagram of a promotion processing system in accordance with an embodiment.
Figure 2:
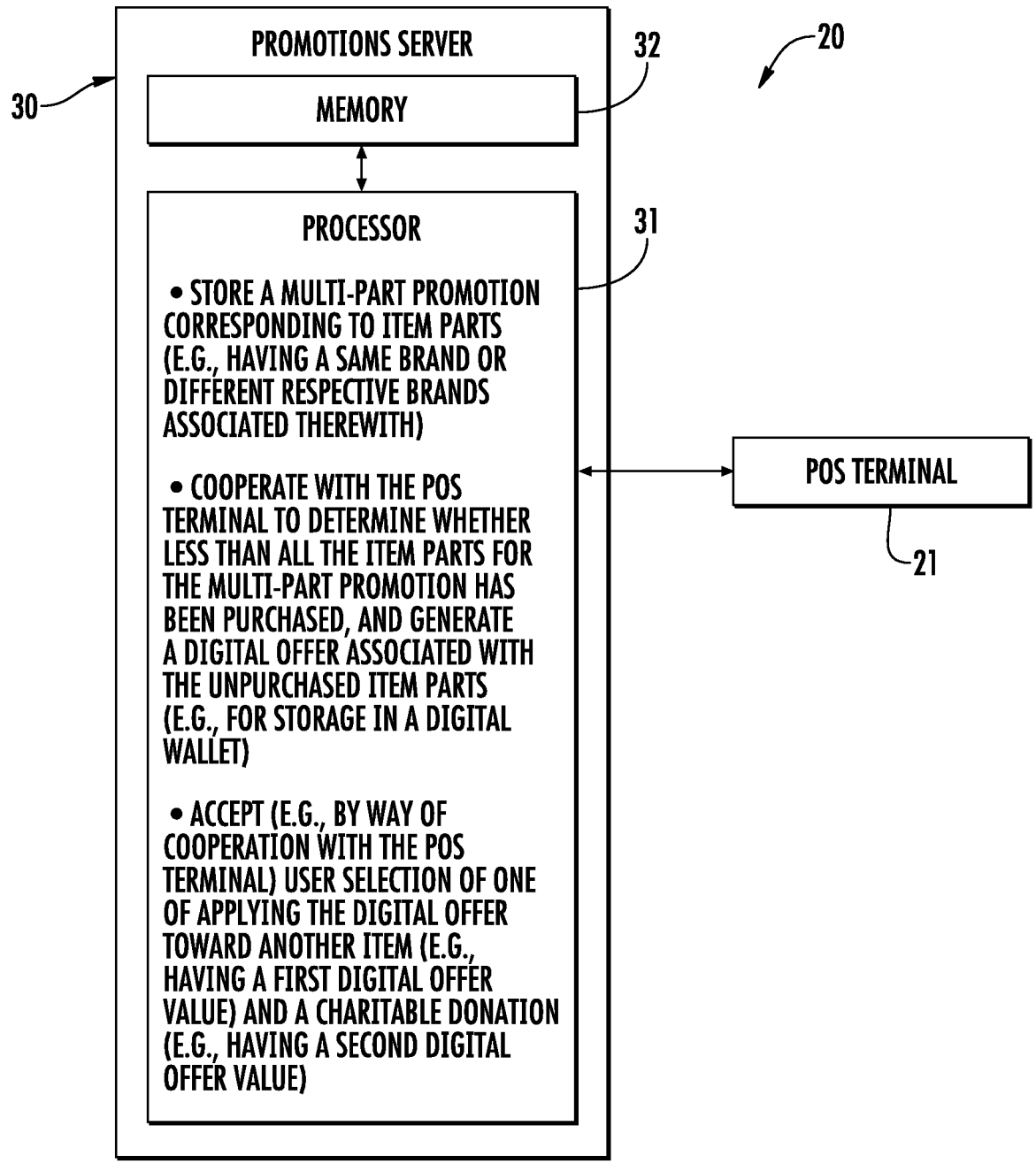
FIG. 2 is a schematic block diagram of the promotion processing system of FIG. 1.

Referring initially to FIGS. 1 and 2, a promotion processing system 20 includes a point-of-sale (POS) terminal 21. The POS terminal 21 may be associated with a retailer and located at a checkout of the retailer. The POS terminal 21 may include an optical scanner, for example, to scan products during a checkout process. As will be appreciated by those skilled in the art, during the checkout process, a store clerk, or in some instances the shopper themselves, typically scans, via the optical scanner the products for purchase, and more particularly, the UPC codes of the products for purchase. Other and unique product codes may be used. The products for purchase are tallied in what may be referred to as the user's shopping basket. Promotions, for example, in the form of coupons (paper or electronic), near the end of the purchase transaction, may also be scanned via the optical scanner or applied (e.g., from a digital wallet), their redeemable values being deducted from the total shopping basket purchase.

The POS terminal 21 may communicate with a promotions server 30, which may manage, for example, provide, process, and authenticate paper and/or digital promotions. The promotions server 30 may also process and manage the retailer's loyalty program, e.g., to maintain purchase histories. The promotions server 30 includes a processor 31 and a memory 32 coupled thereto.

Figure 3:
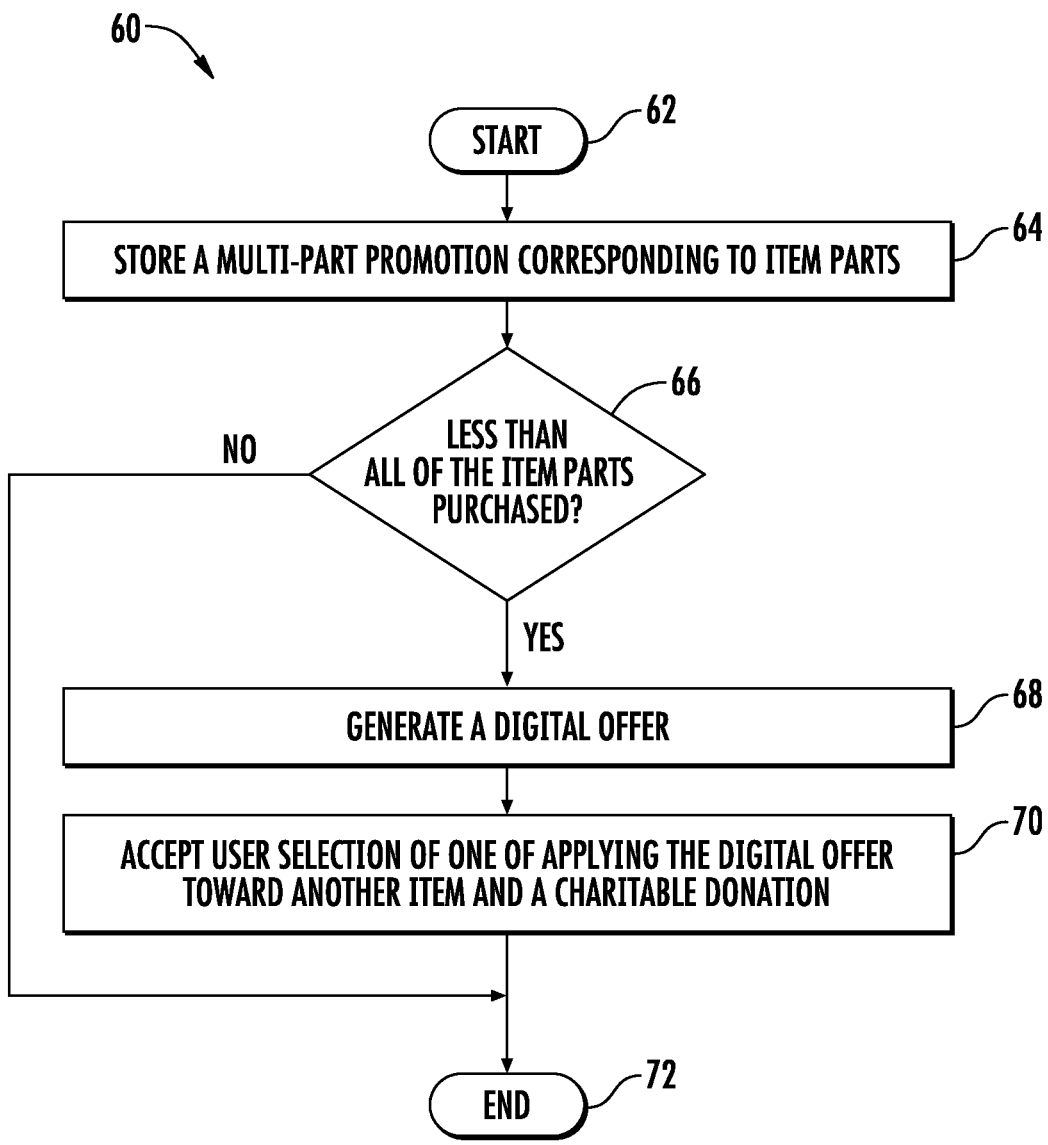
FIG. 3 is a flow diagram of operation of the promotions server of FIG. 2.

Referring now to the flowchart 60 in FIG. 3, beginning at Block 62, operations of the promotions server 30 with respect to processing a promotion will now be described. While operations of the promotions server 30 are described herein, it will be appreciated by those skilled in the art that the operations of the promotions server are performed by way of cooperation between the processor 31 and the memory 32.

At Block 64, the promotions server 30 stores, for example, in the memory 32, a multi-part promotion 23 corresponding to item parts 24a-24n. An exemplary multi-part promotion 23, which may also be referred to as a "complex offer" may be a buy-one, get-one (BOGO) promotion, for example. The multi-part promotion 23 may be a buy-two, get-one promotion or a buy one, receive a discount on one. The item parts 24a-24n may be separate containers of a same product and/or same brand of products, for example, 12-packs of soda. The item parts 24a-24n may be weight increments of a same product, for example, pounds of coffee. The item parts 24a-24n may be different brands or types of items, for example, soda and chips. Accordingly exemplary multi-part promotions may include, "buy two 12-packs of Brand-A Soda and get one 12-pack of Brand-A Soda for free," "buy three pounds of Robusto Brand Coffee and get one pound of Robusto Brand Coffee for free," and "buy Crispy Chips and get $1.00 off a bottle of Brand-A Soda."

The item parts 24a-24n may have a same brand associated therewith. The item parts 24a-24n may have different respective brands associated therewith. There may be any number of item parts 24a-24n.

At Block 66, the promotions server 30 cooperates with the POS terminal 21 to determine whether less than all of the item parts 24a-24n for the multi-part promotion 23 has been purchased. It should be understood by those skilled in the art that by purchased, it is meant that the item parts have been processed at the POS terminal 21 for checkout. For example, in a BOGO promotion, the free item may be considered purchased by way of being scanned or processed at the POS terminal 21.

In an exemplary embodiment where the multi-part promotion 23 is a BOGO or buy-one get a discount on another, the promotions server 30 may determine whether less than all the item parts 24a-24n have been purchased by determining whether one product or the qualifying product was purchased, while determining the free or discounted product was not purchased. In another exemplary embodiment where the multi-part promotion 23 is a buy-two, get one promotion, the promotions server 30 may determine whether less than all the item parts 24a-24n have been purchased by determining whether two products have been purchased, for example to qualify for the multi-part promotion, while determining the free product was not purchased (FIG. 1). Of course, where the multi-part promotion 23 is a buy-two, get one promotion, the promotions server 30 may determine whether less than all the item parts 24a-24n have been purchased by determining whether one or two products have been purchased.

If at Block 66 the promotions server 30 determines that less than all the item parts 24a-24n have been purchased, the promotions server generates a digital offer 25 associated with unpurchased item parts (Block 68). If, at Block 66, the promotions server 30 determines that all of the item parts have been purchased, operations end at Block 72.

The promotions server 30, at Block 70, accepts user selection of one of applying the digital offer toward another item 26 and a charitable donation 27. More particularly, the promotions server 30 may cooperate with the POS terminal 21 to prompt the user to select whether to apply the digital offer toward another item 26 or a charitable donation 27 and accept the user selection.

The promotions server 30 may store the digital offer 25 in a digital wallet 28 associated with the user, for example. The given user may communicate, the stored digital offer 25 to another user. The digital offer 25 may have a value associated therewith. For example, the digital offer 25 may have a value that is less than the purchase price associated with the missing or not purchased item part or parts 24a-24n. Of course, the digital offer 25 may have a value that is the same or more than the purchase price associated with the missing or not purchased item part or parts 24a-24n.

The another item may be associated with a same brand as the item parts 24a-24n. In some embodiments, the another item may be a different brand than that item parts 24a-24n. The digital offer 25 may thus be considered a discount or digital coupon. For example, if the user chooses or selects the application of the digital offer toward another item 26, the digital offer may be in the form of a digital promotion or coupon for a value off the purchase the another item. The user may choose, for example, after selecting application of the digital offer toward another item 26, to communicate the digital promotion 25 or coupon to another user.

The charitable donation 27 may be a cash payment of the value of the purchase price associated with the missing or not purchased item part or parts 24a-24n, for example, to a charity selected by the user (e.g., at the POS terminal 21 or preselected association with the user). The charity recipient of the charitable donation may be not necessarily be a charitable organization, for example, and may be an individual (e.g., a friend, family member, or other user). In other words, the user can send the digital offer 25 as a charitable donation to another person.

In some embodiments, the digital offer 25 may have a first digital offer value for the another item 26 and a second digital offer value for the charitable donation 27. For example, the first digital offer value may be greater than the second digital offer value thus making the digital offer toward the another item 26 more valuable than the charitable donation 27. In some embodiments, the value of the charitable donation 27 may be greater than the value of the digital offer toward the another item 26. Operations end at Block 72.

As will be appreciated by those skilled in the art, a user, while qualifying for a multi-part promotion 23, may not desire all the item parts. The promotion processing system 20 advantageously recognizes when, for example, the qualifying number, but not all, of item parts 24a-24n have been purchased and permits the user to "redeem" a promotion that would otherwise not be redeemed. For example, if the user selects application of the digital offer toward another item 26 of the same brand, goodwill or brand loyalty between the user and brand may be built as the user returns to the brand to redeem the digital offer toward the another item. If, for example, the user selects the charitable donation 27, goodwill may also be built as the user develops a feeling of personal fulfillment by way of the charitable donation.

Figure 4:
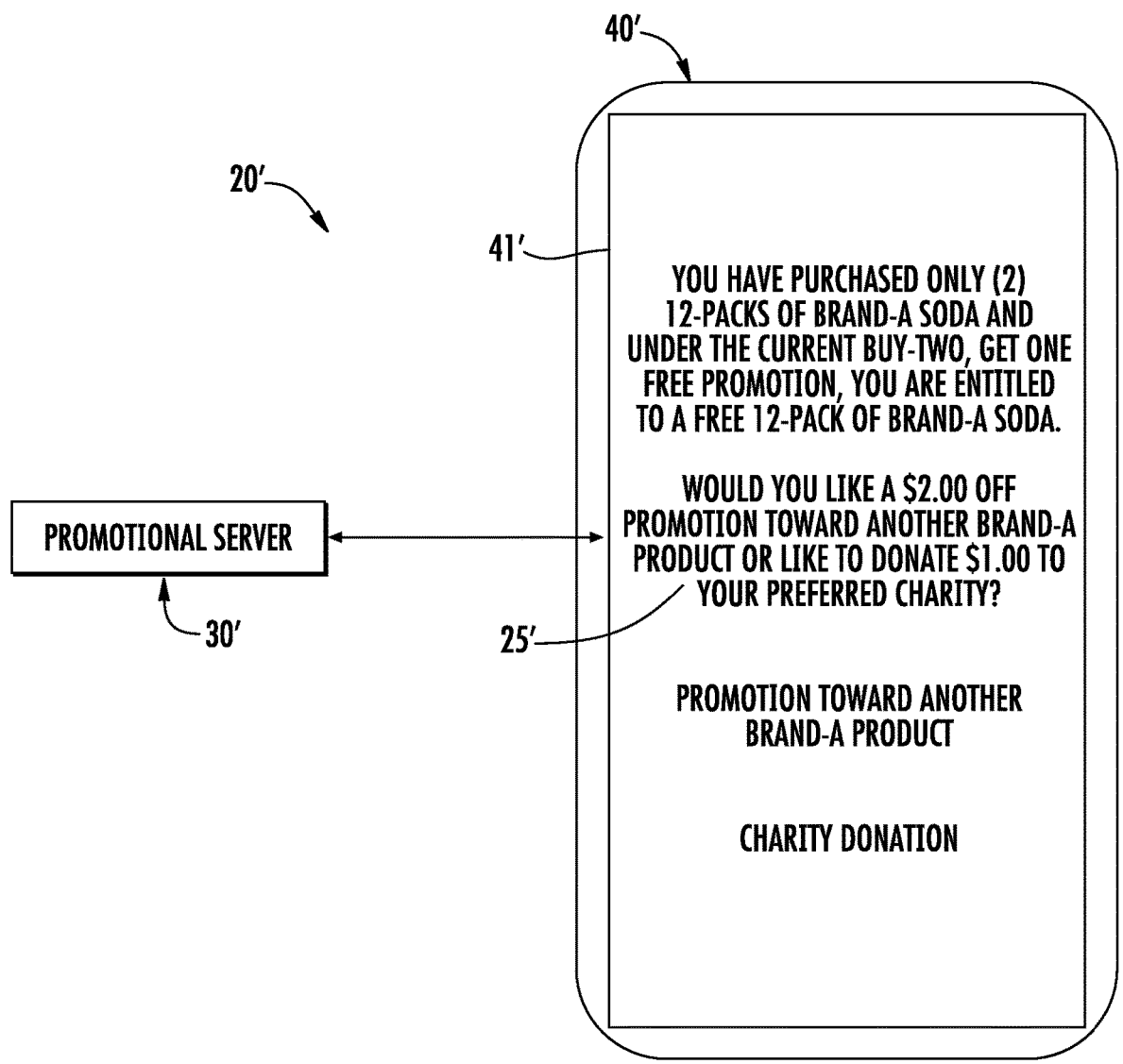
FIG. 4 is a schematic diagram of a promotion processing system in accordance with another embodiment.

Referring now briefly to FIG. 4, in another embodiment, the promotion processing system 20' may include a mobile wireless communications device 40', for example, a mobile or smart phone, tablet computer, or wearable device. Instead, of or in addition to the POS terminal, the promotions server 30' cooperates with the mobile wireless communications device 40' to prompt and accept, via a display 41' of the mobile wireless communications device, the user selection.

A method aspect is directed to a method of processing a promotion. The method includes using a promotions server 30 to store a multi-part promotion 23 corresponding to a plurality of item parts 24a-24n, cooperate with a POS terminal 21 to determine whether less than all of the item parts for the multi-part promotion has been purchased, and generate a digital offer 25 associated with unpurchased item parts. The method also includes using the promotions server 30 to accept user selection of one of applying the digital offer toward another item 26 and a charitable donation 27.

A computer readable medium aspect is directed to a non-transitory computer readable medium for processing a promotion. The non-transitory computer readable medium includes computer executable instructions that when executed by a processor 31 of a promotions server 30 cause the processor to perform operations. The operations include storing a multi-part promotion 23 corresponding to a plurality of item parts 24a-24n, cooperating with a POS terminal 21 to determine whether less than all of the item parts for the multi-part promotion has been purchased, and generating a digital offer 25 associated with unpurchased item parts. The operations also include accepting user selection of one of applying the digital offer toward another item 26 and a charitable donation 27.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a mobile wireless communications device associated with a user;
a point-of-sale (POS) terminal associated with a retailer; and
a promotions server configured to
store a multi-part promotion corresponding to a plurality of item parts, the plurality of item parts comprising one of separate containers of a same product, separate containers having a same given brand associated therewith, and weight increments of a same product, the plurality of item parts further comprising at least one qualifying part and a promotional part,
cooperate with said POS terminal to determine whether less than all of the item parts for the multi-part promotion has been purchased during a purchase transaction at the POS terminal by
determining whether the at least one qualifying part has been processed for checkout at the POS terminal during the purchase transaction, and
determining whether the promotional part has been processed for checkout at the POS terminal during the purchase transaction,
generate a digital offer having first and second redemption values associated therewith, the first redemption value for another item and the second redemption value less than the first redemption value and for a charitable donation in the form of a monetary contribution, the digital offer being associated with unpurchased item parts and generated based upon determining that one of the at least one qualifying part and the promotional part have not been processed for checkout at the POS terminal,
communicate the digital offer to the mobile wireless communications device and cooperate with the mobile wireless communications device to prompt the user to select whether to apply the first or second redemption value toward one of the another item during a future purchase transaction and the charitable donation, respectively, and
cooperate with the mobile wireless communications device to accept, based upon input at the mobile wireless communications device, user selection of one of applying the first or second redemption value toward the another item and the charitable donation, respectively, based upon the prompt.

2. The system of claim 1 wherein the another item has the given brand associated therewith.

3. The system of claim 1 wherein the plurality of item parts have different respective brands associated therewith.

4. The system of claim 1 further comprising a digital wallet associated with the user; and wherein said promotions server is configured to store the digital offer therein.

5. A promotions server comprising:
a processor and an associated memory configured to
store a multi-part promotion corresponding to a plurality of item parts, the plurality of item parts comprising one of separate containers of a same product, separate containers having a same given brand associated therewith, and weight increments of a same product, the plurality of item parts further comprising at least one qualifying part and a promotional part,
cooperate with a POS terminal to determine whether less than all of the item parts for the multi-part promotion has been purchased during a purchase transaction at the POS terminal by
determining whether the at least one qualifying part has been processed for checkout at the POS terminal during the purchase transaction, and
determining whether the promotional part has been processed for checkout at the POS terminal during the purchase transaction,
generate a digital offer having first and second redemption values associated therewith, the first redemption value for another item and the second redemption value less than the first redemption value and for a charitable donation in the form of a monetary contribution, the digital offer being associated with unpurchased item parts and generated based upon determining that one of the at least one qualifying part and the promotional part have not been processed for checkout at the POS terminal,
communicate the digital offer to a mobile wireless communications device associated with a user and cooperate with the mobile wireless communications device to prompt the user to select whether to apply the first or second redemption value toward one of the another item during a future purchase transaction and the charitable donation, respectively, and
cooperate with the mobile wireless communications device to accept, based upon input at the mobile wireless communications device, user selection of one of applying the first or second redemption value toward the another item and the charitable donation, respectively, based upon the prompt.

6. The promotions server of claim 5 wherein the another item has the given brand associated therewith.

7. The promotions server of claim 5 wherein the plurality of item parts have different respective brands associated therewith.

8. The promotions server of claim 5 further comprising a digital wallet associated with the user; and wherein said processor is configured to store the digital offer therein.

9. A method of processing a promotion comprising:
using a promotions server to
store a multi-part promotion corresponding to a plurality of item parts, the plurality of item parts comprising one of separate containers of a same product, separate containers having a same given brand associated therewith, and weight increments of a same product, the plurality of item parts further comprising at least one qualifying part and a promotional part,
cooperate with a POS terminal to determine whether less than all of the item parts for the multi-part promotion has been purchased during a purchase transaction at the POS terminal by
determining whether the at least one qualifying part has been processed for checkout at the POS terminal during the purchase transaction, and
determining whether the promotional part has been processed for checkout at the POS terminal during the purchase transaction,
generate a digital offer having first and second redemption values associated therewith, the first redemption value for another item and the second redemption value less than the first redemption value and for a charitable donation in the form of a monetary contribution, the digital offer being associated with unpurchased item parts and generated based upon determining that one of the at least one qualifying part and the promotional part have not been processed for checkout at the POS terminal,
communicate the digital offer to a mobile wireless communications device associated with a user and cooperate with the mobile wireless communications device to prompt the user to select whether to apply the first or second redemption value toward one of the another item during a future purchase transaction and the charitable donation, respectively, and
communicate with the mobile wireless communications device to accept, based upon input at the mobile wireless communications device, user selection of one of applying the first or second redemption value toward the another item and the charitable donation, respectively, based upon the prompt.

10. A non-transitory computer readable medium for processing a promotion, the non-transitory computer readable medium comprising computer executable instructions that when executed by a processor of a promotions server cause the processor to perform operations comprising:

storing a multi-part promotion corresponding to a plurality of item parts, the plurality of item parts comprising one of separate containers of a same product, separate containers having a same brand associated therewith, and weight increments of a same product, the plurality of item parts further comprising at least one qualifying part and a promotional part;

cooperating with a POS terminal to determine whether less than all of the item parts for the multi-part promotion has been purchased during a purchase transaction by
determining whether the at least one qualifying part has been processed for checkout at the POS terminal during the purchase transaction, and
determining whether the promotional part has been processed for checkout at the POS terminal during the purchase transaction, generating a digital offer having first and second redemption values associated therewith, the first redemption value for another item and the second redemption value less than the first redemption value and for a charitable donation in the form of a monetary contribution, the digital offer being associated with unpurchased item parts and generated based upon determining that one of the at least one qualifying part and the promotional part have not been processed for checkout at the POS terminal;

communicating the digital offer to a mobile wireless communications device associated with a user and cooperating with the mobile wireless communications device to prompt the user to select whether to apply the first or second redemption value toward one of the another item during a future purchase transaction and charitable donation, respectively; and cooperating with the mobile wireless communications device to accept, based upon input at the mobile wireless communications device, user selection of one of applying the first or second redemption value toward the another item and the charitable donation, respectively, based upon the prompt.

\* \* \* \* \*